(12) United States Patent
Zhao et al.

(10) Patent No.: US 11,597,012 B2
(45) Date of Patent: Mar. 7, 2023

(54) ARTICLE AND METHOD

(71) Applicant: The University of Liverpool, Liverpool (GB)

(72) Inventors: Yuyuan Zhao, Liverpool (GB); Kaikan Diao, Liverpool (GB)

(73) Assignee: The University of Liverpool, Liverpool (GB)

( * ) Notice: Subject to any disclaimer, the term of this patent is extended or adjusted under 35 U.S.C. 154(b) by 79 days.

(21) Appl. No.: 17/261,852

(22) PCT Filed: Jul. 19, 2019

(86) PCT No.: PCT/GB2019/052044
§ 371 (c)(1),
(2) Date: Jan. 20, 2021

(87) PCT Pub. No.: WO2020/016613
PCT Pub. Date: Jan. 23, 2020

(65) Prior Publication Data
US 2021/0308758 A1    Oct. 7, 2021

(30) Foreign Application Priority Data
Jul. 20, 2018    (GB) ..................... 1811899

(51) Int. Cl.
*B22F 3/10* (2006.01)
*B22F 3/11* (2006.01)
(Continued)

(52) U.S. Cl.
CPC .............. *B22F 3/1025* (2013.01); *B22F 1/05* (2022.01); *B22F 1/107* (2022.01); *B22F 3/1103* (2013.01);
(Continued)

(58) Field of Classification Search
CPC .......... B22F 3/1025; B22F 1/05; B22F 1/107; B22F 3/1103; B22F 3/1137; B22F 3/1143;
(Continued)

(56) References Cited

U.S. PATENT DOCUMENTS 3,499,066 A    7/1967 Murray
3,751,271 A *  8/1973 Kimura .............. B01D 39/2034
                                              428/596
(Continued)

FOREIGN PATENT DOCUMENTS

JP    H06158113 A  *  6/1994  ................ B22F 3/11
JP    H06158113 A     6/1994
SU    1597250 A1     10/1990

OTHER PUBLICATIONS

JPH06158113A description english translation. (Year: 1994).*

*Primary Examiner* — Anthony J Zimmer
*Assistant Examiner* — Ricardo D Morales
(74) *Attorney, Agent, or Firm* — Stites & Harbison PLLC; Richard S. Myers, Jr.

(57) ABSTRACT

A method of providing an article having a set of directional channels, including a first directional channel, therein is described. The method comprises preparing a mixture including particles comprising a first material and a first binding agent. The method comprises providing an article precursor by surrounding a pattern comprising a second material with the mixture. The method comprises heating the article precursor thereby coalescing the particles to provide the article. The method comprises removing the pattern by reacting the second material to form a gaseous product, thereby providing the set of directional channels in the article, wherein the set of directional channels corresponds with the removed pattern. Such an article is also described.

16 Claims, 5 Drawing Sheets

(51) Int. Cl.
  *B22F 5/10*  (2006.01)
  *B22F 1/05*  (2022.01)
  *B22F 1/107* (2022.01)

(52) U.S. Cl.
  CPC .......... *B22F 3/1137* (2013.01); *B22F 3/1143* (2013.01); *B22F 5/10* (2013.01)

(58) Field of Classification Search
  CPC .. B22F 5/10; B22F 3/10; B22F 3/1021; C04B 38/067
  See application file for complete search history.

(56) References Cited

U.S. PATENT DOCUMENTS

| | | | |
|---|---|---|---|
| 5,774,779 A * | 6/1998 | Tuchinskiy | G01N 30/6043 419/45 |
| 2009/0014101 A1 | 1/2009 | McMasters et al. | |
| 2018/0009032 A1 | 1/2018 | Madhukar et al. | |

* cited by examiner

ARTICLE AND METHOD

CROSS REFERENCE TO RELATED APPLICATIONS

This application is a § 371 National State Application of PCT/GB2019/052044 filed Jul. 19, 2019, which claims priority to GB 1811899.2 filed Jul. 20, 2018.

FIELD

The present invention relates to an article and a method of providing an article, particularly an article having a set of directional channels, including a first directional channel, therein.

BACKGROUND TO THE INVENTION

Porous metals, also known as metal foams or cellular metals, have applications including thermal management, energy absorption, catalyst supports and lightweight structures. Open-cell porous metals, in particular, may be used for heat exchangers and porous electrodes, for example for batteries and wastewater treatment, because these open-cell porous metals have high internal surface areas and good fluid permeabilities. Open-cell porous copper having directional channels (also known as directional pores) therein, is a type of open-cell porous metal having applications including thermal management, particularly heat transfer and/or cooling. Particularly, the directional channels have relatively low fluid flow resistances therealong (i.e. along a direction of the directional channels), thereby improving heat transfer and/or cooling and/or reducing pumping power required to pump coolant through the porous metal.

Particularly, thermal management has become a critical issue in electronics because of increasing volumetric power densities and the harsh environments in which they are deployed. Active cooling is often required for high rates of heat dissipation because conventional passive cooling techniques, such as heat sinks, heat pipes and fin stacks, are inadequate.

Advanced liquid cooling systems based on microchannels and open-cell porous metals have recently attracted much attention. Both microchannels and porous metals can be manufactured to low volumes required at the chip backside. Forced liquid convection in the materials can remove heat at a very high efficiency. However, each system has an inherent drawback that has impeded their wide applications. Microchannels are expensive and porous metals require a high pumping power to move the working fluid through the cooling device.

Preferably, an article comprising a porous metal, for example an open cell porous metal, having directional channels therein has a relatively large volume fraction of the directional channels, as a fraction of the volume of the porous metal. Additionally and/or alternatively, a length of the directional channels is preferably relatively long. Additionally and/or alternatively, a shape, for example a cross-sectional shape, of the directional channels is preferably relatively constant along a length thereof. Additionally and/or alternatively, an aspect ratio of the directional channels is preferably relatively large. Additionally and/or alternatively, a cross-sectional dimension, for example a diameter, of the directional channels is preferably relatively small. Additionally and/or alternatively, an arrangement of the directional channels is preferably predetermined and/or controlled.

However, conventional methods of providing articles comprising porous metals, for example open cell porous metals, having directional channels therein are unable to produce continuous directional channels with controlled size, porosity and/or alignment.

Hence, there is a need to improve articles having directional channels therein.

SUMMARY OF THE INVENTION

It is one aim of the present invention, amongst others, to provide a method of providing an article having a set of directional channels, including a first directional channel, therein and such an article which at least partially obviates or mitigates at least some of the disadvantages of the prior art, whether identified herein or elsewhere.

A first aspect provides a method of providing an article having a set of directional channels, including a first directional channel, therein, the method comprising:

preparing a mixture including particles comprising a first material and a first binding agent;

providing an article precursor by surrounding a pattern comprising a second material with the mixture;

heating the article precursor thereby coalescing the particles to provide the article; and removing the pattern by reacting the second material to form a gaseous product, thereby providing the set of directional channels in the article, wherein the set of directional channels corresponds with the removed pattern.

A second aspect provides an article, for example a heat exchanger, having a set of directional channels, including a first directional channel, therein, the article formed from coalesced particles comprising a first material, wherein a volume of the set of directional channels is in a range from 5% to 70%, preferably from 20% to 60% of the volume of the article.

DETAILED DESCRIPTION OF THE INVENTION

According to the present invention there is provided a method of providing an article having a set of directional channels, as set forth in the appended claims. Also provided is an article, for example a heat exchanger, having a set of directional channels. Other features of the invention will be apparent from the dependent claims, and the description that follows.

Method

A first aspect provides a method of providing an article having a set of directional channels, including a first directional channel, therein, the method comprising:

preparing a mixture including particles comprising a first material and a first binding agent;

providing an article precursor by surrounding a pattern comprising a second material with the mixture;

heating the article precursor thereby coalescing the particles to provide the article; and removing the pattern by reacting the second material to form a gaseous product, thereby providing the set of directional channels in the article, wherein the set of directional channels corresponds with the removed pattern.

In this way, the article may be provided having channels which are open, independent and directional. In this way, channel diameter, quantity and distribution in the article may be controlled. In this way, an arrangement of the directional channels may be predetermined and/or controlled, by the pattern. In this way, an article having a relatively large volume fraction of directional channels, as a fraction of the volume of the article may be provided.

The first aspect provides the method of providing the article having the set of directional channels, including the first directional channel, therein.

Set of Directional Channels

In one example, the first directional channel has a cross-sectional dimension, for example a width or a diameter, (i.e. a transverse dimension) in a range from 20 µm to 1000 µm, preferably in a range from 50 µm to 500 µm and/or a length (i.e. an axial dimension) in a range from 1 mm to 1000 mm, preferably in a range from 20 mm to 100 mm.

In this way, a length of the first directional channel may be relatively long. In this way, a shape, for example a cross-sectional shape, of the first directional channel may be relatively constant along a length thereof. In this way, an aspect ratio of the first directional channel may be relatively large. In this way, a cross-sectional dimension, for example a diameter, of the first directional channel may be relatively small.

It should be understood that the set of directional channels is comprised of a number of single (i.e. discrete) directional channels aligned parallel or substantially parallel with each other and/or arranged in a predetermined spacing and/or pattern, to give rise to a pre-determined volume fraction of directional channels in the article.

Preparing the Mixture

The method comprises preparing the mixture including the particles comprising the first material and the first binding agent. That is, the method comprises mixing the particles with the first binding agent, for example to provide a homogeneous mixture.

Particles Comprising First Material

In one example, the first material comprises a metal and/or alloy thereof, and/or an oxide thereof and/or mixtures thereof. In one example, the metal is a transition metal, for example a first row, a second row or a third row transition metal. In one example, the metal is Sc, Ti, V, Cr, Mn, Fe, Co, Ni, Cu or Zn. Preferably, the metal is Fe, Co, Ni, Cu or Zn. In one example, the alloy is a steel, a shape memory allow or an iron, cobalt or nickel superalloy. In one example, the shape memory alloy is a copper-aluminium-nickel based alloy, a nickel-titanium based alloy, an iron based alloy such as an Fe—Mn—Si based alloy, a copper based alloy such as a Cu—Zn—Al based alloy or a Cu—Al—Ni based alloy, a zinc based alloy or a gold based alloy. In one example, the metal oxide is copper oxide or nickel oxide.

It should be understood that the particles are solid and may include discrete and/or agglomerated particles. In one example, the particles have a regular shape, such as a spherical or a substantially spherical shape. In one example, the particles have an irregular shape, such as a spheroidal, a flake or a granular shape.

Generally, the particles may comprise any material amenable to fusion by heating, such as metals or non-metals, for example metal oxides.

The particles may comprise an additive, an alloying addition, a flux, a binder and/or a coating. The particles may comprise particles having different compositions, for example a mixture of particles having different compositions.

It should be understood that unalloyed metals refer to metals having relatively high purities, for example at least 95 wt. %, at least 97 wt. %, at least 99 wt. %, at least 99.5 wt. %, at least 99.9 wt. %, at least 99.95 wt. %, at least 99.99 wt. %, at least 99.995 wt. % or at least 99.999 wt. % purity.

It should be understood that the particles comprising the first material provide, at least in part, the article (i.e. a body or substrate thereof). It should be understood that the article is hence formed from the particles comprising the first material. It should be understood that the article is formed from the first material and/or a material obtainable from the first material, for example a reaction product thereof such as a reduced first material or an oxidized first material.

The particles may be produced by atomisation, such as gas atomisation or water atomisation, or other processes known in the art. The particles may have regular, such as spherical, shapes and/or irregular, such as spheroidal, flake or granular, shapes.

In one example, the particles have a size of at most 250 µm, at most 150 µm, at most 100 µm, at most 75 µm, at most 50 µm, at most 25 µm, at most 15 µm, at most 10 µm, at most 5 µm, or at most 1 µm. In one example, the particles have a size of at least 150 µm, at least 100 µm, at least 75 µm, at least 50 µm, at least 25 µm, at least 15 µm, at least 10 µm, at least 5 µm, or at least 1 µm. In one example, the particles have a size in a range from 5 µm to 250 µm, preferably in a range from 10 µm to 50 µm. In one example, at least 50% by weight of the particles have a size in a range from 5 µm to 250 µm, preferably in a range from 10 µm to 50 µm. In one example, at least 90% by weight of the particles have a size in a range from 5 µm to 250 µm, preferably in a range from 10 µm to 50 µm. In one example, at least 95% by weight of the particles have a size in a range from 5 µm to 250 µm, preferably in a range from 10 µm to 50 µm.

For regular shapes, the size may refer to the diameter of a sphere or a rod, for example, or to the side of a cuboid. The size may also refer to the length of the rod. For irregular shapes, the size may refer to a largest dimension, for example, of the particles. Suitably, the particle size distribution is measured by use of light scattering measurement of the particles in an apparatus such as a Malvern Mastersizer 3000, arranged to measure particle sizes from 10 nm to 3500 micrometres, with the particles wet-dispersed in a suitable carrier liquid (along with a suitable dispersant compatible with the particle surface chemistry and the chemical nature of the liquid) in accordance with the equipment manufacturer's instructions and assuming that the particles are of uniform density.

In one example, the mixture includes the first material in a range from 50% to 99.5%, preferably in a range from 60% to 95%, more preferably in a range from 70% to 90% by volume of the mixture.

First Binding Agent

In one example, the first binding agent comprises an adhesive, for example polyvinyl alcohol or a wax; a fatty acid, for example isostearic acid, lauric acid, linolenic acid, palmitic acid, stearic acid, oleic acid, linoleic acid or arachidic acid; and/or a solvent, for example a volatile organic solvent such as methanol, ethanol, isobutyl alcohol, methyl ethyl ketone, trichloroethylene or toluene.

In one example, the mixture includes the first binding agent in a range from 0.5% to 50%, preferably in a range from 5% to 40%, more preferably in a range from 10% to 30% by volume of the mixture. In this way, binding of the particles in the precursor may be achieved.

Mixture

In one example, the mixture comprises and/or is a flowable mixture, for example a suspension, a slurry or a paste. In this way, the mixture may flow around the pattern, thereby surrounding the pattern.

Providing the Article Precursor

The method comprises providing the article precursor by surrounding the pattern comprising the second material with the mixture.

Article Precursor

It should be understood that the article precursor is a green of the article, having the pattern therein.

Surrounding the Pattern

In one example, the method comprises partially surrounding the pattern with the mixture. That is, at least a part, for example a surface, of the pattern may be exposed i.e. not contacting or not coated by the mixture. In one example, the method comprises completely surrounding the pattern with the mixture. That is, the pattern may be fully coated by the mixture.

Pattern

It should be understood that the pattern is made of the second material and the pattern defines, at least in part, the set of directional channels, as described below. It should be understood that the pattern is a removable pattern, wherein the pattern is removed by reacting the second material to form the gaseous product, as described below.

In one example, the second material comprises a polymeric composition comprising a thermoplastic polymer, for example polyester, polypropylene, polyethylene and/or polystyrene.

In this way, the pattern may be removed by combusting (i.e. reacting with oxygen), for example, the second material, thereby forming the gaseous product including $H_2O$ and $CO_2$, for example.

In one example, the pattern comprises a set of fibres (also known as filaments), including a first fibre. In one example, the first directional channel corresponds with (i.e. has a same or similar shape, size and/or orientation) the first fibre. In one example, the set of directional channels corresponds with the set of fibres. In one example, respective directional channels of the set of directional channels corresponds with respective fibres of the set of fibres. In one example, the pattern comprises a set of fibres, including a first fibre and a second fibre, preferably mutually aligned and/or mutually spaced apart. In one example, the first fibre is a monofilament. In one example, the first fibre comprises a bundle. In one example, the first fibre has a cross-sectional dimension, for example a width or a diameter, (i.e. a transverse dimension) in a range from 20 μm to 1000 μm, preferably in a range from 50 μm to 500 μm and/or a length (i.e. an axial dimension) in a range from 1 mm to 1000 mm, preferably in a range from 20 mm to 100 mm.

In this way, a length of the first directional channel may be relatively long, defined. In this way, a shape, for example a cross-sectional shape, of the first directional channel may be relatively constant along a length thereof. In this way, an aspect ratio of the first directional channel may be relatively large. In this way, a cross-sectional dimension, for example a diameter, of the first directional channel may be relatively small.

In one example, the method comprises arranging the set of fibres, for example on a jig. In this way, an arrangement of the set of fibres may be predetermined and/or controlled whereby an arrangement of the directional channels may be predetermined and/or controlled.

Coating the Pattern

In one example, the method comprises coating the pattern with particles of the first material and a second binding agent, before surrounding the pattern with the mixture. In this way, the pattern may be more fully surrounded by the particles.

In one example, the second binding agent comprises an adhesive, for example polyvinyl alcohol.

Heating the Article Precursor

The method comprises heating the article precursor thereby coalescing the particles to provide the article. That is, coalescing the particles is achieved, at least in part, by heating the particles such that adjacent particles are mutually fused, forming an agglomerate of the particles. It should be understood that coalescing may be thus achieved at a temperature below a melting point of the particles, for example in a temperature range in which solid-state diffusional processes provide the coalescing. In one example, the coalescing is by sintering the particles by heating the particles only (i.e. without an externally applied load such as compression of the particles during heating thereof), without melting (i.e. liquification) of the particles. In one example, the coalescing is by sintering the particles by heating the particles and applying an externally applied load such as compression, for example uniaxial, biaxial, triaxial or isostatic compression of the particles during heating thereof, without melting (i.e. liquification) of the particles.

In one example, the coalescing the particles comprises coalescing at least some, for example a majority, of the particles. That is, coalescing of all of the particles may not be required to provide the article. In one example, coalescing the particles comprises coalescing all or substantially all of the particles.

Presence of Oxygen

In one example, the heating comprises heating the article precursor in the presence of oxygen at a first temperature for a first period, wherein removing the pattern by reacting the second material and/or combusting the second material to form the gaseous product. In this way, the pattern may be removed by combustion thereof.

In one example, the heating comprises heating the article precursor in the presence of oxygen at a second temperature for a second period, thereby oxidising the particles to provide oxidised particles, wherein coalescing the particles comprises coalescing the oxidised particles.

In one example, the heating comprises heating the article precursor in the presence of oxygen at a first temperature for a first period, wherein removing the pattern by reacting the second material and/or combusting the second material to form the gaseous product and wherein coalescing the particles optionally comprises oxidising the particles to provide oxidised particles, for example wherein the first material comprises a metal or an alloy thereof, wherein coalescing the particles comprises coalescing the oxidised particles, for example the oxide of the metal or the alloy thereof. That is, removing the pattern, optional oxidation of the particles and coalescing the oxidised particles are concurrent i.e. simultaneous.

In one example, the first temperature is in a range from 500° C. to 800° C., preferably in a range from 600° C. to 700° C. In one example, the first period (i.e. a duration of time) is in a range from 5 minutes to 180 minutes, preferably in a range from 20 minutes to 60 minutes.

In one example, the second temperature is in a range from 500° C. to 800° C., preferably in a range from 600° C. to 700° C. In one example, the second period (i.e. a duration of time) is in a range from 5 minutes to 180 minutes, preferably in a range from 20 minutes to 60 minutes. In one example, the second temperature is equal to the first temperature and/or the second period is equal to the first period.

Removing the Pattern

The method comprises removing the pattern by reacting the second material to form the gaseous product, thereby providing the set of directional channels in the article, wherein the set of directional channels corresponds with the removed pattern. That is, the pattern is eliminated from the article by reaction to form the gaseous product. Since the product is gaseous, removal of the gas from the article, for example via the set of directional channels and/or via interparticle pores and/or intraparticle pores, as described below. In this way, the pattern may be completely removed from the article, without residue thereof remaining. In contrast, removal of a pattern by melting thereof may result in melt residues remaining in the article, contaminating the article and/or at least partly obstructing the set of directional channels, the interparticle pores and/or the intraparticle pores. In contrast, removal of a pattern by solid or mechanical extraction thereof may result at least a portion of the pattern remaining in the article, contaminating the article and/or at least partly obstructing the set of directional channels.

Reducing

In one example, the method comprises:

heating the oxidised particles in an absence of oxygen and/or in a reactant or in a vacuum at a third temperature for a third period, thereby reducing the oxidised particles to provide the article having the set of directional channels therein.

In one example, the third temperature is in a range from 700° C. to 1300° C., preferably in a range from 800° C. to 1200° C., more preferably in a range from 900° C. to 1100° C. In one example, the third temperature is in a range from $0.7T_m$ to $0.99T_m$, preferably in a range from $0.8T_m$ to $0.95T_m$, wherein $T_m$ is a melting point of the first material. In one example, the third period in a range from 15 minutes to 48 hours, preferably in a range from 2 hours to 24 hours. For example, oxidised copper may be reduced in vacuum at 1000° C. for 6 hours, and oxidised nickel may be reduced in a reducing atmosphere with hydrogen gas flow at 1200° C. for 20 minutes.

Porosity

It should be understood that the article, having the set of directional channels therein, formed by coalescing the particles may have porosity arising from three distinct types of pores:

a) The set of directional channels (also known as directional pores);
b) Interparticle pores between the coalesced particles; and
c) Intraparticle pores within the coalesced particles.

Generally, porosity (also known as void fraction) is a measure of void (i.e. "empty") spaces in a material, and is a fraction of a volume of voids over a total volume of the article, between 0 and 1, or as a percentage between 0% and 100%.

These three types of pores may be interconnected (also known as open pores) or isolated (also known as closed pores). In one example, at least 50%, at least 75% or at least 90% by volume of pores therein are interconnected pores.

Generally, the porosity of the article may be determined by porosimetry, for example mercury intrusion porosimetry according to UOP578-11, by density according to ASTM D792 or ISO 1183 and/or image analysis of sections thereof. Porosimetry, for example, may be used to determine the porosity due to each of the three types of pores.

In one example, a volume of the set of directional channels is in a range from 5% to 70%, preferably from 20% to 60% of the volume of the article.

In one example, a density of the article, excluding the set of directional channels, is in a range of from 60% to 95%, preferably from 80% to 90% of the density of the first material.

In one example, the article comprises a porous article, having the set of directional channels therein. It should be understood that the porosity in the porous article is additional to that due to the set of directional channels, for example due to interparticle and/or intraparticle pores. In one example, the article comprises an open-cell porous article, having the set of directional channels therein.

Example Routes

Hence, three example routes of the method include:

A. Metal particles (i.e. the particles) are oxidised, forming metal oxide powders, during heating in a presence of oxygen and coalesced, for example by forming initial bonds therebetween, at a temperature below a reaction temperature, for example a combustion temperature, of the second material comprising the pattern. As the temperature is increased to above the combustion temperature, for example, further oxidation of the metal particles and sintering of the oxidised metal particles take place, forming stronger bonds between the particles. The oxide matrix (i.e. the coalesced metal oxide particles) may be subsequently reduced to the metal at a high temperature either in vacuum or in a hydrogen atmosphere, for example, depending on the metal.

B. Metal oxide particles (i.e. the particles) form relatively weak bonds due to preliminary sintering at a temperature below a reaction temperature, for example a combustion temperature, of the second material comprising the pattern. As the temperature is increased to above the combustion temperature, for example, further sintering of the metal oxide particles takes place, forming relatively stronger bonds between the metal oxide particles. The oxide matrix (i.e. the coalesced metal oxide particles) may be subsequently reduced to the metal at a high temperature either in vacuum or in a hydrogen atmosphere, for example, depending on the metal.

C. Metal particles are coalesced under pressure (i.e. compression, for example uniaxial, biaxial, triaxial or isostatic pressure) to form relatively weak mechanical bonds. As the temperature is increased to above a reaction temperature, for example a combustion temperature, of the second material comprising the pattern, the mechanical bonds support the article precursor (i.e. sustain the green compact without collapsing). As the temperature is increased to above the combustion temperature, for example, sintering of the metal particles takes place, forming relatively stronger bonds between the metal particles. This route does not require a subsequent reduction step process.

Article

In one example, the article comprises and/or is a heat exchanger.

For example, the article may be used in heat transfer and thermal management applications. For example, directional porous Cu may be in conjunction with a cooling liquid or cooling gas and provide a heat sink material for cooling apparatus such as miniaturized and highly integrated electronic chips and power devices.

Article

A second aspect provides an article, for example a heat exchanger, having a set of directional channels, including a first directional channel, therein, the article formed from coalesced particles comprising a first material, wherein a volume of the set of directional channels is in a range from 5% to 70%, preferably from 20% to 60% of the volume of the article.

The article, the heat exchanger, the directional channels, the first directional channel, the particles and/or the first material may be as described with respect to the first aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Example Method 1

Figure 1:
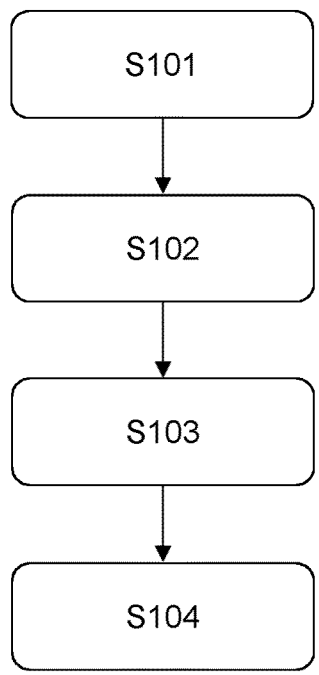
FIG. 1 schematically depicts a method of providing an article having a set of directional channels therein, according to an exemplary embodiment.

FIG. 1 schematically depicts a method of providing an article having a set of directional channels therein, according to an exemplary embodiment.

The article has the set of directional channels, including a first directional channel, therein.

At S101, a mixture including particles comprising a first material and a first binding agent is prepared.

At S102, an article precursor is provided by surrounding a pattern comprising a second material with the mixture.

At S103, the article precursor is heated thereby coalescing the particles to provide the article.

At S104, the pattern is removed by reacting the second material to form a gaseous product, thereby providing the set of directional channels in the article, wherein the set of directional channels corresponds with the removed pattern.

The method may include any of the steps described herein, for example with respect to the first aspect.

Example Method 2

Figure 2:
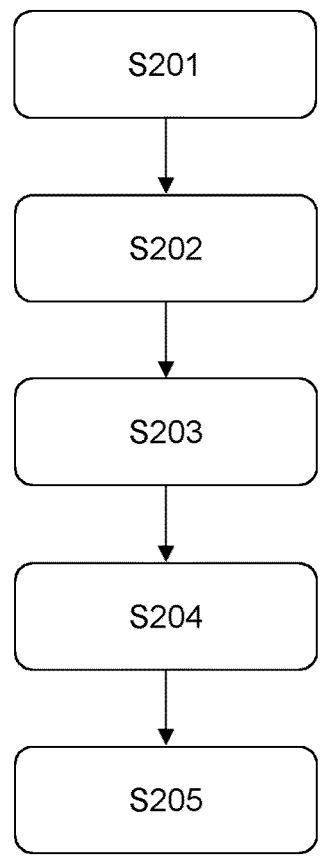
FIG. 2 schematically depicts a method of providing an article having a set of directional channels therein, according to an exemplary embodiment.

FIG. 2 schematically depicts a method of providing an article having a set of directional channels therein, according to an exemplary embodiment. Particularly, in this example, the method is of providing a porous copper article having a set of directional channels therein.

At S201, a mixture including particles comprising a first material and a first binding agent is prepared. Particularly, Cu (i.e. the first material) particles are mixed with a binder (ethanol or PVA glue) (i.e. the first binding agent) to form a Cu particle slurry (i.e. the mixture). The Cu particle slurry is made by mixing Cu powder and the binder (ethanol or PVA glue, approximately 20 vol. % of the Cu powder).

At S202, an article precursor is provided by surrounding a pattern comprising a second material with the mixture.

Firstly, polylactic acid (PLA) fibres (i.e. the pattern) are coated with Cu powder (i.e. the particles comprising the first material) using a binder (i.e. a second binding agent). The PLA fibres are painted with PVA glue and then dredged in Cu powder so that the PLA fibres are fully surrounded by Cu particles in order to improve integrity of the channels in the final product.

Secondly, the coated PLA fibres are subsequently embedded (i.e. surrounded) in the Cu particle slurry, thereby providing the article precursor. The Cu coated PLA fibres are embedded in the slurry layer by layer in a mould.

In more detail, a thin layer of Cu powder slurry is spread in a mould. The coated PLA fibres are uniformly laid on the thin layer of Cu powder slurry. Then, another layer of Cu powder slurry is spread over these coated PLA fibres, ensuring filling the gaps between the coated PLA fibres. This layering process is repeated until a desired thickness is reached. The coated PLA fibres are preferably arranged in the mould straight and directional (i.e. mutually aligned and/or mutually spaced apart, whereby an arrangement of the directional channels is predetermined and/or controlled). A volume fraction of the channels in the Cu matrix is controlled by the quantity of the PLA fibres in the material and can be up to 0.7. The channel diameter is controlled by the diameter of the PLA fibres, e.g. ranging from 100 μm to 1000 μm.

In this example, S203 and S204 are concurrent. At S203, the article precursor is heated thereby coalescing the particles to provide the article and at S204, removing the pattern by reacting the second material to form a gaseous product, thereby providing the set of directional channels in the article, wherein the set of directional channels corresponds with the removed pattern. Particularly, the article precursor is heated in the atmosphere (i.e. air, in the presence of oxygen) at 650° C. for 30 mins so as to oxidize the Cu particles, sinter the oxidized Cu particles and decompose the PLA fibres to form a sintered directional porous CuO.

At S205, the oxidised particles are heated in an absence of oxygen and/or in a reactant or in a vacuum at a third temperature for a third period, thereby reducing the oxidised particles to provide the article having the set of directional channels therein. Particularly, the sintered directional porous CuO is heated in a vacuum ($<4\times10^{-2}$ mBar) at 1000° C. for 6 hours in order to reduce the CuO to Cu.

The method may include any of the steps described herein, for example with respect to the first aspect.

This process may be used to produce materials having micro-channel structure and these micro-channels are independent and may have controllable channel diameters. Commonly, the volume fraction of channels in the Cu matrix can be up to 70%. The volume fraction of channels is varied depending on the quantity of the PLA fibres in the material.

The metallic particles may comprise copper or copper oxide. The metallic particles may have any particle sizes depending upon the application that the material is to be used for and the pore size required, and preferably within the range from 5 to 75 microns. There are no particular limitations on the form of powder.

Preferably, the quantity of PLA fibres additive in the material may be up to 70 vol % and this will approximately relate to the production of a material with a volume fraction of channels in the Cu matrix up to 70%. The solid density of the Cu matrix may be greater than 85%. The small interstices or voids between the metal particles result from partial sintering.

The addition of the binder helps to evenly coat the metallic powder on the PLA fibres and to ensure homogeneous distribution of the coated PLA fibres in the metallic powder slurry. For coating the metallic powder on the PLA fibres, the binder may be PVA glue. For distributing the coated PLA fibres in the metal particle slurry, PVA glue or ethanol may be used as the binder to mix with Cu powder for high channel volume fraction (>60%) or low channel volume fraction (<60%), respectively. Preferably, the quantity of the binder in the slurry is about 30%.

The directional porous Cu may be used to produce a wide range of products in a number of different fields. In particular, the material may be used in heat transfer and thermal management applications. For example, directional porous Cu may be in conjunction with a cooling liquid and provide a heat sink material for cooling apparatus such as miniaturized and highly integrated electronic chips and power devices.

Example Article 1

Figure 3:
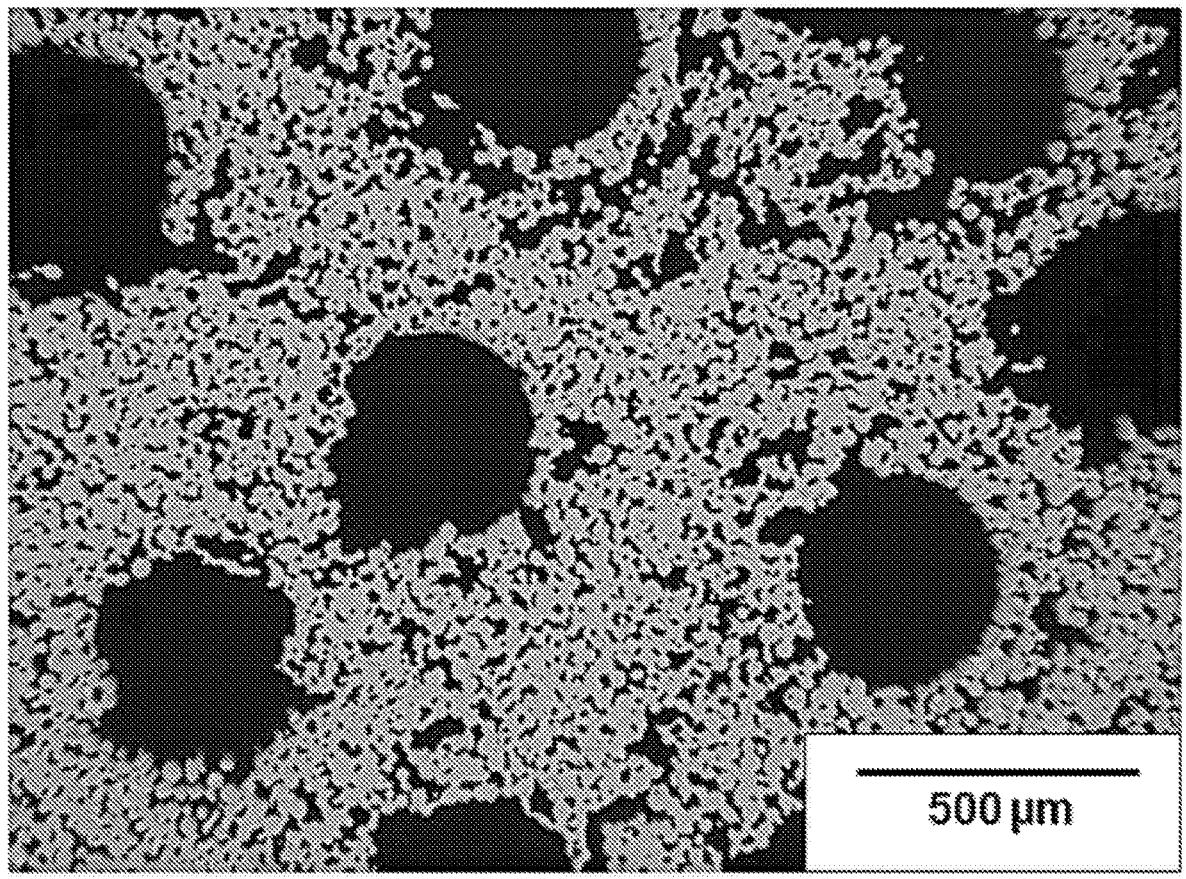
FIG. 3 shows an optical micrograph of cross-section of an article having a set of directional channels therein, according to an exemplary embodiment.

FIG. 3 shows an optical micrograph of cross-section of an article 10 having a set of directional channels 100 therein, according to an exemplary embodiment. Particularly, FIG. 3 is an optical micrograph of the article 10, specifically directional porous Cu (i.e. a first material), showing a cross section perpendicular to the set of directional channels 100.

Figure 4:
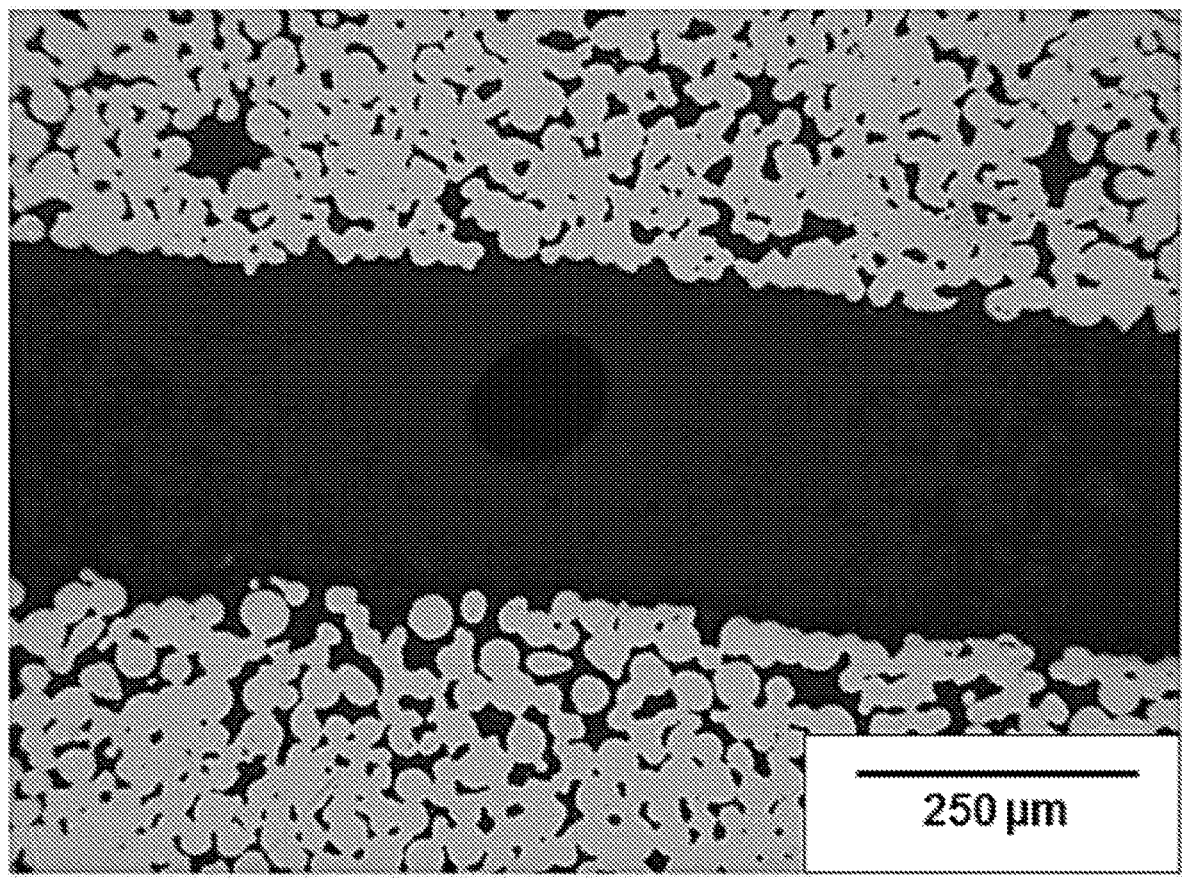
FIG. 4 shows an optical micrograph of a longitudinal cross-section of the article of FIG. 3.

FIG. 4 shows an optical micrograph of a longitudinal cross-section of the article 10 of FIG. 3. Particularly, FIG. 4 is an optical micrograph the article 10, showing a cross section parallel to the set of directional channels 100.

The article 10 has the set of directional channels 100, including a first directional channel 100A, therein. The article 10 is formed from coalesced particles 1000 comprising the first material, wherein a volume of the set of directional channels 100 is in a range from 5% to 70%, preferably from 20% to 60% of the volume of the article.

The article 10 was provided as described above with respect to Example method 2. 170 pieces of PLA fibres with diameter of 390 μm were painted in PVA glue and then dredged in copper powder with particle size <20 μm. The copper powder slurry was formed by mixing copper powder with ethanol (30 vol. %). The coated PLA fibres were embedded in the Cu powder slurry layer by layer in mould with dimension of 2×3×0.5 cm³. The preform was heated in the atmosphere at 650° C. for 30 mins. The preform was then moved to a vacuum furnace and sintered in a vacuum atmosphere ($<4\times10^{-2}$ mBar) at 1000° C. for 6 hours. As a result, directional channels with a diameter of 390 μm in the Cu matrix were obtained. The volume fraction of the channels in Cu matrix was about 20%.

The open channels of the material as produced in this experiment can be seen in FIGS. 3 and 4. FIG. 3 is the transverse sectional view (perpendicular to the channel direction) and shows that the channels in the material have the same diameter as the PLA fibres and are uniformly distributed. FIG. 4 is the longitudinal sectional view (parallel to the channel direction) and shows that the channels in the material are straight and open. The solid density of the sintered Cu matrix in FIGS. 1 and 2 is over 85%.

Example Article 2

Figure 5:
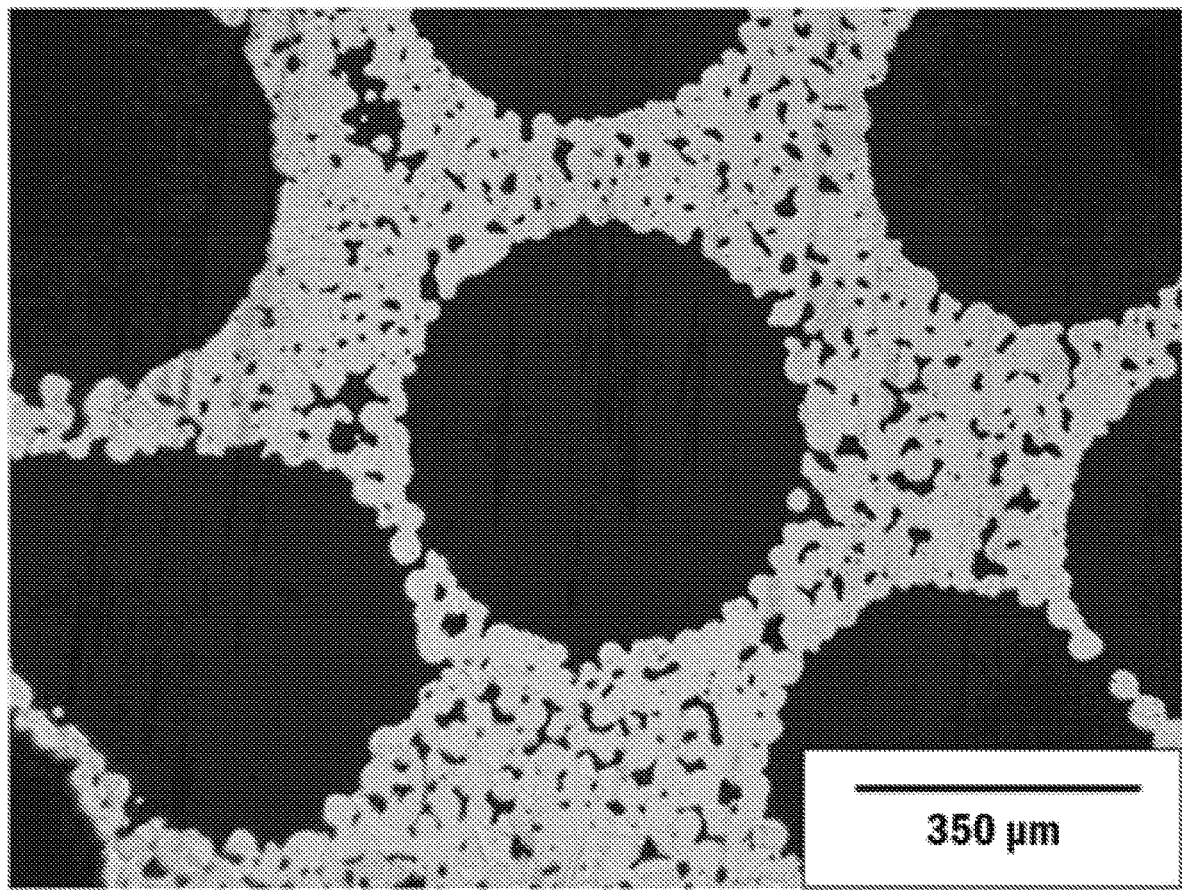
FIG. 5 shows an optical micrograph of cross-section of an article having a set of directional channels therein, according to an exemplary embodiment.

FIG. 5 shows an optical micrograph of cross-section of an article 20 having a set of directional channels 200 therein, according to an exemplary embodiment. Particularly, FIG. 5 is an optical micrograph of a sample of the directional porous Cu material (i.e. the article 20), showing a cross section perpendicular to the channels.

The article 20 was provided as described above with respect to Example method 2. 440 pieces of PLA fibres with diameter of 450 μm were painted in PVA glue and then dredged in copper powder with particle size <20 μm. The copper powder slurry was formed by mixing copper powder with PVA glue (30 vol. %). The coated PLA fibres were embedded in the Cu powder slurry layer by layer in mould with dimension of 2×3×0.5 cm³. The preform was heated in the atmosphere at 650° C. for 30 mins. The preform was then moved to a vacuum furnace and sintered in a vacuum atmosphere ($<4\times10^{-2}$ mBar) at 1000° C. for 6 hours. As a result, directional channels with a diameter of 450 μm in the Cu matrix were obtained. The volume fraction of the channels in Cu matrix was about 70%.

The open channels of the material as produced in this experiment can be seen in FIG. 5.

Heat Transfer

Table 1 shows heat transfer coefficients and pressure drops for conventional copper microchannels, porous copper manufactured by a Lost Carbonate Sintering (LCS) process, and directional porous copper according to an exemplary embodiment, measured under the same test conditions (water flow rate: 2 l min$^{-1}$). The test data shows that the directional porous copper has both an excellent heat transfer coefficient, comparable to LCS porous metals, and a reduced pressure drop, comparable to conventional microchannels.

TABLE 1

Heat transfer coefficients and pressure drops for conventional copper microchannels, porous copper manufactured by a Lost Carbonate Sintering (LCS) process, and a directional porous copper according to an exemplary embodiment

| Key performance indicators under forced water cooling | Diameter μm | Porosity % | Heat transfer coefficient kW m$^{-2}$ K$^{-1}$ | Pressure drop kPa |
|---|---|---|---|---|
| Cu microchannels | 500 | | 14 | 25 |
| LCS porous Cu | 425-710 | 67 | 23 | 188 |
| Directional porous Cu | 450 | 20 | 24 | 23 |

Although a preferred embodiment has been shown and described, it will be appreciated by those skilled in the art that various changes and modifications might be made without departing from the scope of the invention, as defined in the appended claims and as described above.

In summary, the invention provides a method of providing an article having a set of directional channels, including a first directional channel, and such an article. In this way, the article may be provided having channels which are open, independent and directional. In this way, channel diameter, quantity and distribution in the article may be controlled. In this way, an arrangement of the directional channels may be predetermined and/or controlled, by the pattern. In this way, an article having a relatively large volume fraction of directional channels, as a fraction of the volume of the article may be provided.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method of providing an article having a set of directional channels, including a first directional channel, therein, the method comprising:

preparing a mixture including particles comprising a first material and a first binding agent;
providing an article precursor by surrounding a pattern comprising a second material with the mixture;
heating the article precursor thereby coalescing the particles to provide the article; and
removing the pattern by reacting the second material to form a gaseous product, thereby providing the set of directional channels in the article, wherein the set of directional channels corresponds with the removed pattern;
wherein the heating comprises heating the article precursor in the presence of oxygen at a first temperature for a first period, wherein removing the pattern is by reacting the second material and/or combusting the second material to form the gaseous product; and
wherein the heating comprises heating the article precursor in the presence of oxygen at a second temperature for a second period, thereby oxidizing the particles to provide oxidized particles, wherein coalescing the particles comprises coalescing the oxidized particles; and
wherein the method further comprises heating the oxidized particles in an absence of oxygen and/or in a reactant or in a vacuum at a third temperature for a third period, thereby reducing the oxidized particles to provide the article having the set of directional channels therein.

2. The method according to claim 1, comprising:
coating the pattern with particles of the first material and a second binding agent, before surrounding the pattern with the mixture.

3. The method according to claim 1, wherein the first material comprises a metal and/or alloy thereof, and/or an oxide thereof and/or mixtures thereof.

4. The method according to claim 1, wherein the particles have a size in a range from 5 μm to 250 μm.

5. The method according to claim 1, wherein the second material comprises a polymeric composition comprising a thermoplastic polymer.

6. The method according to claim 1, wherein the first binding agent comprises an adhesive; a fatty acid; and/or a solvent.

7. The method according to claim 1, wherein the second binding agent comprises an adhesive or plastic glue.

8. The method according to claim 1, wherein the pattern comprises a set of fibers or filaments.

9. The method according to claim 8, comprising arranging the set of fibers.

10. The method according to claim 1, wherein the first directional channel has a cross-sectional dimension in a range from 20 μm to 1000 μm and/or a length in a range from 1 mm to 1000 mm.

11. The method according to claim 1, wherein a volume of the set of directional channels is in a range from 5% to 70% of the volume of the article.

12. The method according to claim 1, wherein a density of the article, excluding the set of directional channels, is in a range of from 60% to 95% of the density of the first material.

13. The method according to claim 1, wherein the article comprises and/or is a heat exchanger.

14. An article having a set of directional channels, including a first directional channel, therein, the article formed from coalesced particles comprising a first material, wherein a volume of the set of directional channels is in a range from 20% to 60% of the volume of the article.

15. The method according to claim 1, wherein the first material comprises a metal and/or alloy thereof, wherein the metal is Sc, Ti, V, Cr, Mn, Fe, Co, Ni, Cu or Zn.

16. The method according to claim 1, wherein heating the article precursor thereby coalescing the particles and removing the pattern are concurrent.

* * * * *